May 17, 1966  E. GATEAU  3,251,440
SERVO-CONTROLLED MOTOR AND TRANSMISSION UNITS
Filed March 24, 1964  2 Sheets-Sheet 1
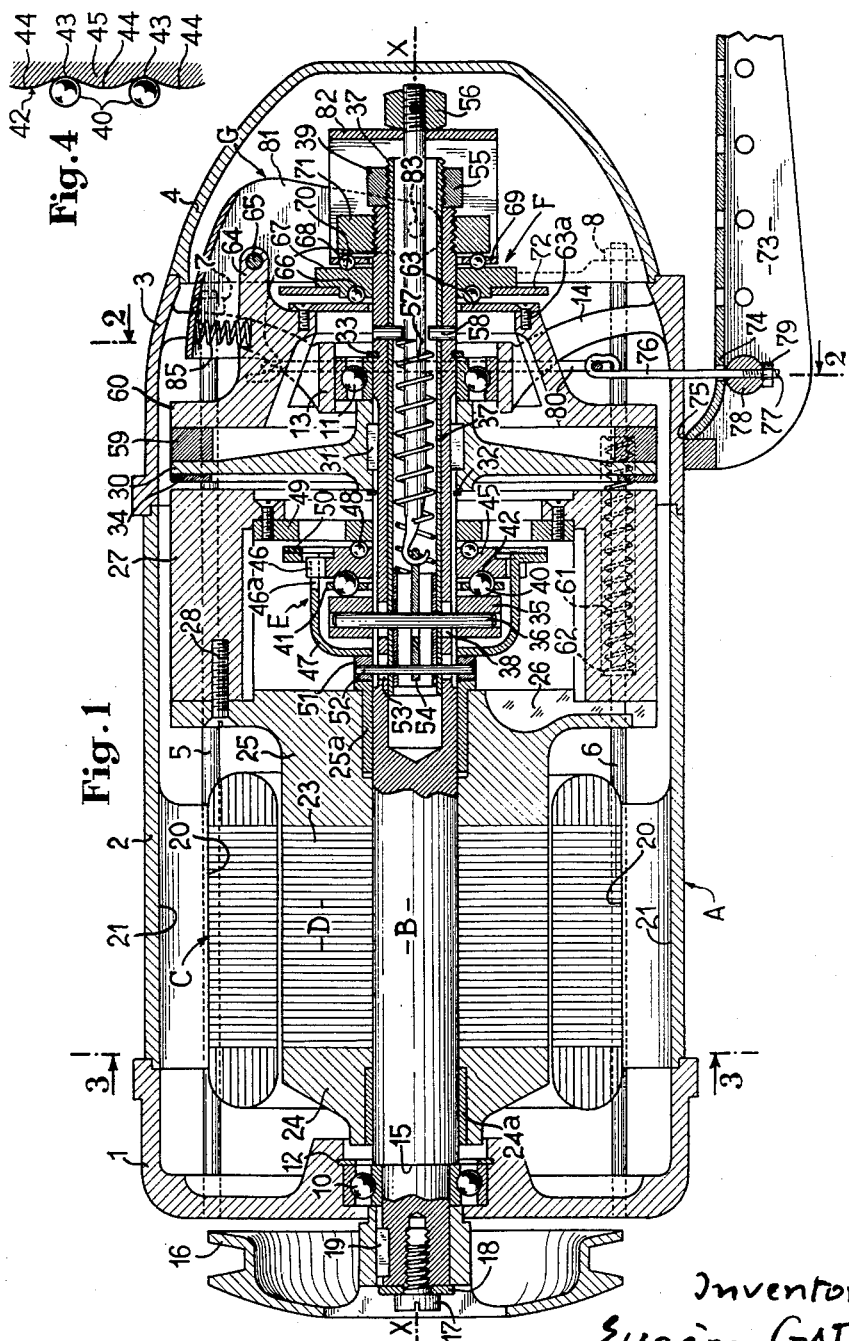

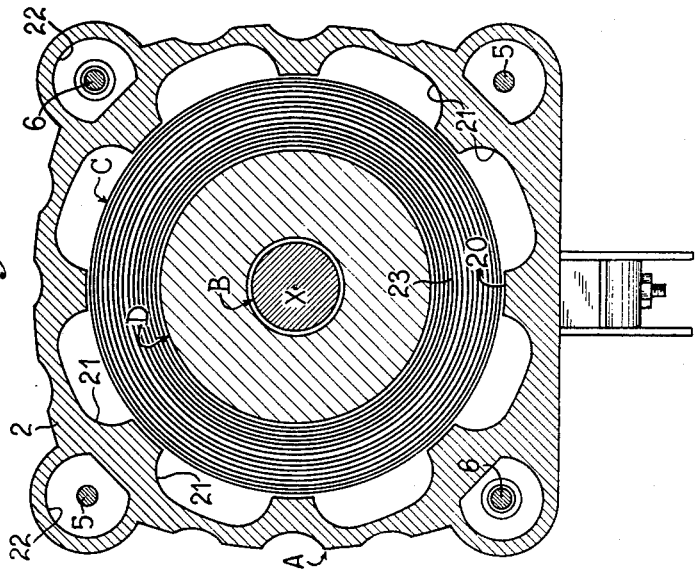
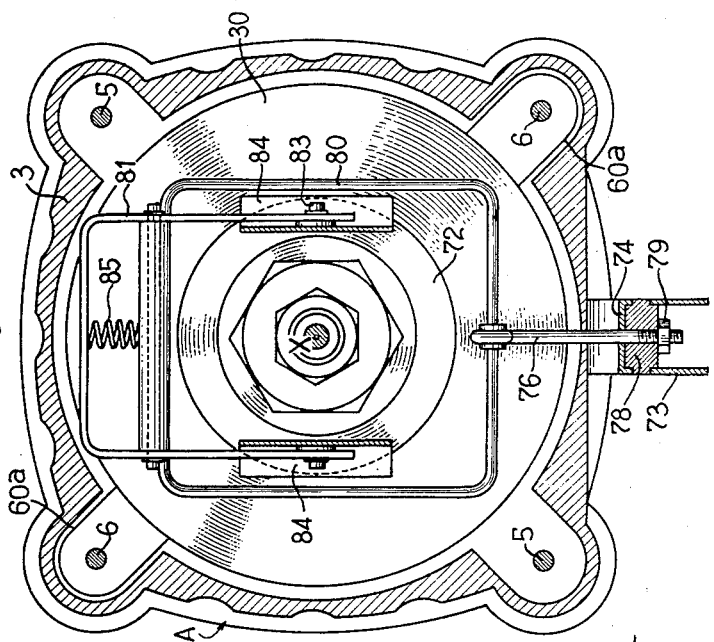

United States Patent Office 3,251,440
Patented May 17, 1966

3,251,440
SERVO-CONTROLLED MOTOR AND
TRANSMISSION UNITS
Eugène Gateau, Cerizay (Deux-Sevres), France
Filed Mar. 24, 1964, Ser. No. 354,398
Claims priority, application France, Mar. 29, 1963,
929,770, Patent 1,360,369
7 Claims. (Cl. 192—18)

The invention relates to servo-controlled motor and transmission units comprising an electric motor and flywheel with a built-in and controlled clutch and brake, such units being used more particularly to drive sewing machines.

The drive shaft is generally mounted for both rotation and sliding; in the inoperative state it is braked by the action of a spring which displaces the said shaft axially, and a plate rigidly connected to the shaft, so that the plate comes into contact with a stationary element rigidly connected to the frame and which locks it with the rotating shaft.

The shaft is rotated by the axial displacement of the shaft and plate towards a flywheel rigidly connected to the motor rotor, such axial displacement being produced by the action of a pedal which compresses the spring.

This axial displacement releases the plate from the stationary element and causes the other surface of the plate to rub against the flywheel, which then drives it.

An arrangement of this kind has various disadvantages, and more particularly the following:

Since the shaft is axially movable, the pulley which it bears and which is connected to the mechanism it is required to drive must participate in the axial displacement and to a certain extent this constitutes an obstacle to the transmission while on the other hand the shaft cannot take the axial braking and clutching forces which are transmitted to the bearings.

Also, the sewing machine operator has to provide the brake release force and the force required for the friction-produced driving torque; in practice, the sum of these two forces is an appreciable cause of fatigue to the operator and the values of the braking and clutching torques are limited in practice by the acceptable fatigue for the operator.

The object of the invention is to obviate these disadvantages and it therefore relates to an improved motor and transmission unit characterised more particularly in that the rotating motor shaft is axially immovable, and apart from the conventional transmission pulley a brake and clutch plate is also secured to the shaft, the combined brake and clutch elements being axially movable with respect to the shaft on each side of the said plate.

Since the shaft is axially immovable, the same applies to the transmission pulley and this simplifies the transmission while the shaft, which rotates at the same speed as the rotor, can act as a fixed abutment for clutching and braking, so that there is no axial force on the bearings.

The movable part of the clutch is preferably rigidly connected to the motor rotor.

The clutch and the brake are preferably of the type described in the French application No. P.V. 917,466 filed on December 4, 1962 by Mr. R. L. A. Leveau for an "Improved Disc Coupling System of Use as a Brake or Clutch" which issued into French Patent No. 1,349,351, granted on December 9, 1963.

The double use of this type of clutch and brake enables some of the energy dissipated as heat to be used both for braking and clutch operation, the operator now having to provide only a force proportional to the braking or clutch torque, in a ratio which in practice may be as low as desired.

The embodiment described hereinafter also allows the following:

The control lever can be swivelled into any position about a pivot.

The brake plate can be moved from the off position to the on position without the control lever being moved;

Ventilation is possible outside the motor, such ventilation being operative only during on-load operation.

Other features will be apparent from the following description.

In the accompanying drawing, which is given solely by way of example:

FIG. 1 is a longitudinal section in the braked inoperative position of an improved motor and transmission unit according to the invention;

FIGS. 2 and 3 are cross-sections on the lines 2—2 and 3—3 in FIG. 1;

FIG. 4 is a partial developed section of the clutch system cam.

According to the exemplified embodiment illustrated, the improved motor and transmission unit according to the invention comprising an electric motor and flywheel, with a built-in brake and clutch, comprises in combination:

A stationary casing A;
A shaft B with the centre line X—X, mounted for rotation in the casing;
A stator C secured to the casing;
A rotor D with a flywheel and fan as described hereinafter, said rotor being adapted to rotate and slide on the shaft B;
A clutch system E for connecting rotor D to the shaft B;
A brake system F to brake the shaft B;
A single control device G for the clutch and brake systems E and F respectively.

Each of these devices will be described in succession.

*Casing A.*—This is made up of 4 elements 1, 2, 3, 4 which are connected by two pairs of rods 5, 6 with each pair disposed diagonally. One of the ends of each rod is screwthreaded and is screwed into the element 1. The pair of rods 5 connects the elements 1, 2, 3 by means of nuts 7 (top right in FIG. 1). The other pair 6 holds the element 4 by means of nuts 8 (bottom right in FIG. 1), the element 4 being a detachable lid or cap to give access to the control elements.

*Shaft B.*—This is mounted for rotation on two bearings 10, 11. Bearing 10 is held in element 1 of casing A by a split ring 12. The other bearing 11 is housed in a bearing surface 13 connected by arms 14 to element 3 of casing A, the system 3, 13, 14 preferably being in one piece.

At one end shaft B is held on the bearing 10 by a shoulder 15 on the shaft, and at the other end by the hub of a pulley 16 which is locked on the bearing by a screw 17 and a washer 18; a key 19 locks the pulley 16 on the shaft B.

*Stator C* (FIGS. 1 and 3).—This is housed in the recess 20 of the element 2 of the casing. This recess is grooved at 21 and in the corners it has longtiudinal apertures 22 into which the rods 5 and 6 fit with clearance, the free space in the apertures, together with the grooves 21, being intended for circulation of cooling air as will be described hereinafter.

*Rotor D.*—On each side of the laminations 23 it comprises two solid parts 24, 25 adapted to receive two anti-friction rings 24a and 25a, by means of which it is rotatably mounted and slides on the shaft B, and to form a fan 26 and enable a flywheel 27 to be secured by screws 28.

The fan 26 delivers air to the left through the ducts 21. This air flows from left to right through the longitudinal apertures 22 and is then taken up again by ventilation at its centre.

*Clutch device E.*—This comprises in combination with the brake described hereinbelow a plate 30 which is locked for rotation with the shaft B by two keys 31 and longitudinally by two split rings, one of which 32 is disposed on the left and the other 33 on the right, the latter also holding the bearing 11. A friction lining 34 is glued to the left-hand surface of the plate 30, which is the operative surface for the clutch.

A ring 35 is longitudinally adjustable on the shaft B. To this end a pin 36 connects the ring 35 to a tubular element 37 through two apertures 38 in the shaft B; a nut 39 (on the right in FIG. 1) screwed to the threaded end of the element 37 enables the position of the ring 35 along the shaft B to be adjusted. Two balls 40 are held diametrically opposite one another by a cage 41. As described in the above-mentioned Leveau French patent application, they bear on the one hand against the ring 35 and on the other hand against a circular runway of variable depth which for each ball has a bottom point 43 and, at 90° to the right and left, a top point 44 (FIG. 4).

This runway 42 is formed in one of the surfaces of an element 45 of generally circular shape except for two lugs 46 engaging in two notches 46a in a bell-shaped element, with respect to which the element 45 is keyed for sliding, i.e., rigid as regards rotation but free axially.

On the opposite surface of the element 45 balls 48 form a stop. Opposite the element 45 with respect to the said balls 48 is a plate 49 which is screwed to the flywheel 27.

The bell element 47 bears on the right a friction lining 50 which is adapted to contact the plate 49 when the element 47 is moved to the right by means of a thrust ring 51. The latter, which is mounted for sliding on the shaft, participates with the axial movements of a longitudinal plate 54 by means of a pin 52 passing through two apertures 53 in the shaft B. Longitudinal plate 54 is connected by a rod 55 and an adjustable nut 56 to the control system G, which will be described hereinafter. A spring 57 bearing against two lugs 58 housed in the shaft B urges the plate 54 to the left.

*Brake system F.*—This comprises a friction lining 59 stuck to the right-hand surface of the plate 31. Opposite it a brake plate 60 has on its periphery two diagonally disposed lugs 60a (FIG. 2) through which the rods 6 pass freely. Two springs 61 bear against these lugs and surround the rods 6 and tend to urge the brake plate 60 to the right while in turn bearing against a collar 62 on the rods.

A support plate 63 is secured by screws 63a to the right-hand surface of the plate 60.

In its top part the plate 60 also has an arm 64 which is drilled at 65 and through which extends the pivot axis of the control device G described hereinafter. Balls 66 bear against the right-hand surface of the plate 63 and form a stop between the latter and a cam-slot element 67 which, for braking purposes, has a similar function to the element 45 for the clutch system. Balls 68 held by the cage 69 bear against an identical track 70 to the track 42 for the clutch system. The balls 68 bear against a screw-threaded ring 71 screwed in an adjustable position to a screwthreaded portion of the shaft B. The circular plate 72 is rigidly connected to the element 67.

*Control system G.*—This comprises a lever 73 which can be actuated at any point of its length between its end and the point 74. The lever bears at 75 against the element 3 of the casing A. At 74 it bears against a rod 76 which is screwthreaded at 77, through the agency of a swivel joint 78 and a nut 79 (FIGS. 1 and 2). The other end of the threaded rod 76 is hooked to a linkage 80 providing the connection between said rod and a U-element 81 in the form of a bellwire lever. This element is articulated to the plate 60 at 65.

It can re-transmit the movement communicated to it by the rod 76, which is in turn actuated by the lever 73, to an element 82 by an articulation 83. At the end of its arms this U-element has friction pads 84 (FIG. 2) which bear on the circular plate 72 under the action of a spring 85 (top right in FIG. 1) bearing on the arm 64 of the plate 60.

Element 82 is centrally drilled for free passage of the rod 55, the nut 56 being adapted to bear on it.

The operation is as follows:

It will be assumed that voltage has been applied to the motor, i.e., that the rotor is rotating. Shaft B is in the position shown in the drawing, in the braked position. Since the lever 73 is not urged down by the operator, the plate 72 is frictionally applied to the pads 84 of the element 82; any prior rotary movement of the shaft B will have involved a rotary movement of the nut 71 and hence a relative rotary movement between the bearing surfaces of the balls 68; the latter will have been compelled to run on their track 70, and this will finally have moved the element 67 away to the left, and the same applies to the plate 63 and the plate 60 connected thereto. If the ring 71 has been suitably adjusted the plate has therefore come into contact with the lining and the shaft B is braked. If the lever 73 is actuated so as to pull on the threaded rod 76, the lever 81 drawn by the linkage 80 swings in the anti-clockwise direction, the element 82 connected thereto by the articulation 83 moves away to the right (FIG. 1), and the contact between the pads 84 and the plate 72 ceases; element 67 is free to turn and under the thrust of the springs 61 acting on the plate 60, the plate 63 and the balls 66, the element 67 recedes to the right until the balls 66 are at the deepest point of their circular runway 70. This movement eliminates the contact between the lining and the plate 60 and thus liberates the shaft B.

At the same time, the movement of the part 82 to the right acts on the nut 56 and drives the rod 55, plate 54, pin 52, ring 51 and finally the bell element 47 from left to right until the lining 50 pushes the plate 49 and finally the rotor and flywheel 27, until the latter comes into contact with the lining 34 of the plate 31.

As a rule, this contact is inadequate to overcome the resistive torque applied to the pulley 16, but the friction of the lining 50 rotates it and the part 47 and the element 45 through the agency of the lugs 46; the resultant relative movement between the ring 35 and the element 45 causes the balls 40 to roll, tending to bring them from the bottom point 43 to a top point 44 of their track 42 (FIG. 4). Being applied against the ring 35 which is held axially immovable, the balls 40 urge the element 45, balls 48, plate 49 and finally flywheel 27 of the rotor C from left to right, thus providing effective clutching.

If lever 73 is released, the various elements return to the original position under the effect of the spring 85, thus initially producing declutching and then braking.

The invention is naturally not limited to the embodiment described and illustrated, which has been given solely by way of example.

Having now described my invention what I claim and desire to secure by Letters Patent is:

1. A unit comprising an electric motor having a stator, a rotor and a rotary shaft in coaxial relation with each other, the shaft being rotatable relative to the rotor and axially stationary relative to the stator, the clutch device for coupling the rotor to the shaft and a brake device for braking the shaft, the clutch and brake devices respectively having an axially movable part and an axially fixed part, a plate rigidly fixed to the shaft constituting said fixed parts of the clutch and brake devices, the movable part of the brake device being axially movable relative to the stator, means operatively connected to the brake movable part for selectively applying the brake movable part against said plate and separating the brake movable part from said plate, the movable part of the clutch device being axially movable relative to the stator and operatively connected to the rotor so as to rotate with the rotor and means operatively connected to the clutch movable part for selectively applying the clutch movable part against said plate and separating the clutch movable part from said plate.

2. A unit as claimed in claim 1, comprising means fixing said clutch movable part to the rotor.

3. A unit as claimed in claim 1, comprising a flywheel fixed to the rotor and comprising said clutch movable part, the rotor being axially movable relative to the stator.

4. A unit as claimed in claim 1, further comprising a single control device, and connecting means operatively connecting the clutch device and the brake device to the control device so that the latter actuates said clutch and brake devices.

5. A unit comprising an electric motor having a stator, a rotor and a rotary shaft in coaxial relation with each other, the shaft being rotatable relative to the rotor and axially stationary relative to the stator, a cluch device for coupling the rotor to the shaft and a brake device for braking the shaft, the clutch and brake device respectively having an axially movable part and an axially fixed part, a plate rigidly fixed to the shaft constituting said fixed parts of the clutch and brake devices, the movable part of the brake device being axially movable relative to the stator, means operatively connected to the brake movable part for selectively applying the brake movable part against said plate and separating the brake movable part from said plate, the movable part of the clutch device being axially movable relative to the stator and operatively connected to the rotor so as to rotate with the rotor, and means operatively connected to the clutch movable part for selectively applying the clutch movable part against said plate and separating the clutch movable part from said plate, the unit further comprising a control device for actuating the clutch and brake devices, the control device comprising a single control lever, means operatively connecting the control lever to the brake device for applying the movable part of the brake device against said plate in a first direction of movement of the lever, and separating the brake movable part from said plate in a second direction of movement of the lever, and means operatively connecting the brake movable part to the clutch movable part so that the clutch movable part is applied against said plate when the brake movable part is separated from said plate, whereby when the lever separates the brake movable part from said plate it automatically applies the clutch movable part against said plate.

6. A unit as claimed in claim 1, comprising blades of a fan on the rotor, and ducts and longitudinal intake apertures adjacent the periphery of the stator, whereby the blades create a circulation of ventilating air which travels along said ducts.

7. A unit comprising an electric motor having a stator, a rotor and a rotary shaft in coaxial relation to each other, the rotor being axially movable relative to the stator the shaft being rotatable in the rotor and axially stationary relative to the stator, a clutch device for coupling the rotor to the shaft and the brake device for braking the shaft, the clutch and brake devices respectively having an axially movable part and an axially fixed part, a plate rigidly fixed to the shaft constituting said fixed parts of the clutch and brake devices, the movable part of the brake device being axially movable relative to the stator, means operatively connected to the brake movable part for selectively applying the brake movable part against said plate and separating the brake movable part from said plate, means fixing the clutch movable part to the rotor, and means operatively connected to the clutch movable part for selectively applying the clutch movable part against said plate and separating the clutch movable part from said plate.

References Cited by the Examiner

UNITED STATES PATENTS 2,757,766　8/1956　McCroskey et al. ____ 192—18
2,771,973　11/1956　Frye _____ 192—18
3,123,193　3/1964　Marland.

DAVID J. WILLIAMOWSKY, *Primary Examiner.*